United States Patent
Ruiz Aldama et al.

(10) Patent No.: US 9,903,340 B2
(45) Date of Patent: Feb. 27, 2018

(54) SYSTEM AND METHOD OF CONTROLLING A WIND TURBINE

(71) Applicant: Acciona Windpower, S.A., Navarra (ES)

(72) Inventors: Alfonso Ruiz Aldama, Navarra (ES); Diego Otamendi Claramunt, Navarra (ES); Teresa Arlaban Gabeiras, Navarra (ES); Ana Fernandez Garcia De Iturrospe, Navarra (ES); Alejandro Gonzalez Murua, Navarra (ES); Jose Miguel Garcia Sayes, Navarra (ES); Miguel Nunez Polo, Navarra (ES)

(73) Assignee: Acciona Windpower, S.A. (ES)

( * ) Notice: Subject to any disclaimer, the term of this patent is extended or adjusted under 35 U.S.C. 154(b) by 403 days.

(21) Appl. No.: 14/560,240

(22) Filed: Dec. 4, 2014

(65) Prior Publication Data
US 2015/0176566 A1 Jun. 25, 2015

(30) Foreign Application Priority Data
Dec. 4, 2013 (ES) .................................. 201331773

(51) Int. Cl.
*F03D 7/02* (2006.01)
*F03D 7/04* (2006.01)

(52) U.S. Cl.
CPC ........... *F03D 7/0224* (2013.01); *F03D 7/024* (2013.01); *F03D 7/043* (2013.01); *F05B 2270/326* (2013.01); *Y02E 10/723* (2013.01)

(58) Field of Classification Search
CPC ...... F03D 7/024; F03D 7/0224; F03D 7/0284; F03D 7/0296; F03D 7/043; F03D 7/044; F03D 7/045; F03D 7/048; Y02E 10/723
See application file for complete search history.

(56) References Cited

U.S. PATENT DOCUMENTS

| 2011/0193343 A1 | 8/2011 | Nakashima et al. |
| 2013/0045098 A1 | 2/2013 | Taylor |

FOREIGN PATENT DOCUMENTS

| DE | 29715249 U1 | 2/1999 | |
| EP | 1666723 A1 * | 6/2006 | ............... F03D 7/04 |
| EP | 1666723 A1 | 7/2006 | |

(Continued)

OTHER PUBLICATIONS

Bunse et al., Influences of Vertical Wind Profiles on Power Performance Measurements, Feb. 25, 2009, URL:http://www.dewi.de/dewi_res/fileadmin/pdf/publications/Publikations/2_Bunse.pdf.

*Primary Examiner* — Igor Kershteyn
*Assistant Examiner* — Brian P Wolcott
(74) *Attorney, Agent, or Firm* — Hayes Soloway PC

(57) ABSTRACT

It describes a control system and method of a wind turbine to operate it in optimum output operation in situations wherein incidents occur. To do this a series of measurements are taken of elements in the surrounding area of the wind turbine which incide it to be able to calculate blade pitch angle set-points to reorientate or move the same until positions designated in accordance with said pitch angle set-point. The method described here is based, among other parameters, on the wind speed; so that it provides for at least two possible control situations in accordance with said speed: one when the speed is less than a rated value and another when said speed is greater than a rated value.

18 Claims, 8 Drawing Sheets

(56) References Cited

FOREIGN PATENT DOCUMENTS

| EP | 1978246 | A1 | 8/2008 |
|----|---------|----|--------|
| EP | 2169219 | A2 | 3/2010 |
| EP | 2249029 | A2 | 10/2010 |
| ES | 2357077 |    | 2/2010 |
| WO | 2012136279 | A2 | 10/2012 |

\* cited by examiner

| Wind direction $\psi$ | $\alpha$ | $P \geq P_{NOM}$ $\varphi$ | $P < P_{NOM}$ $\varphi$ | A |
|---|---|---|---|---|
| Sector 1 | 1 | 0° | 270° | $A_1$ |
| Sector 2 | 0,5 | 0° | 270° | $A_2$ |
| Sector 3 | 0,2 | 0° | 270° | $A_3$ |
| Sector 4 | 0,7 | 0° | 270° | $A_4$ |

FIG.3

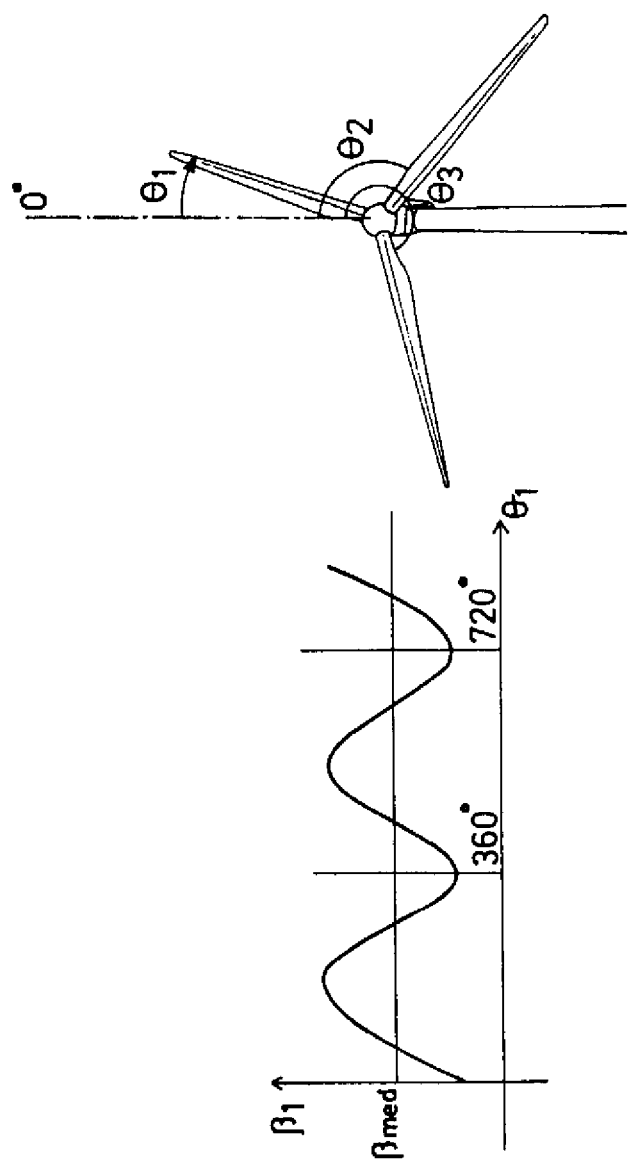

SYSTEM AND METHOD OF CONTROLLING A WIND TURBINE

OBJECT OF THE INVENTION

The present invention is included in the field of electricity generation from wind power.

The object of the invention consists of a wind turbine control method comprising manipulating it in accordance with a blade pitch angle which provides the maximum energy capture, after calculating it in different conditions.

BACKGROUND OF THE INVENTION

Nowadays, the use of renewable energies for electricity generation is very common, being wind power one of the most efficient among them. Wind power makes it possible to obtain electricity from the wind by using wind turbines. Said wind turbines basically include a tower, a nacelle which houses a rotary electric generator and a rotor formed in turn by at least two blades, and a power train which transmits power from the rotor to the electric generator. The power train may comprise a gearbox with a low-speed shaft connected to the rotor and a high-speed shaft connected to the electric generator.

In multi-Megawatt wind turbines, there is a trend towards larger rotors, which provide energy at a lower cost. In said configurations there is an increasing importance of the control system. Said system makes it possible to maximize the energy production whilst limiting the mechanical loads produced by the wind. To do this, the control system acts on the blade pitch angle and on the torque demanded to the generator.

On the one hand, the blade pitch angle is controlled by actuators disposed in the root of each blade, which makes the blade rotate around its longitudinal axis. Said actuation manages to vary the aerodynamic behaviour of the blade. On the other hand, the control system regulates the torque demanded to the generator from the converter.

The torque control in accordance with the electric generator speed Q includes different control areas:
- a first control area (at low wind speeds) wherein the torque is regulated to maintain the rotation speed constant;
- as the wind speed increases, it enters into a control area wherein the electric torque demand T is made so that the ratio between the blade tip speed and the wind speed at the hub height (Tip Speed Ratio (TSR)) is maintained in an optimum value which maximizes the aerodynamic power capture of the wind;
- once the maximum rotation speed is reached, the torque is regulated to maintain the rotation speed constant in said maximum value until reaching the rated power of the wind turbine. This occurs at a wind speed which will be hereinafter called rated wind speed.

The blade pitch control also includes different control areas:
- A control area below the rated wind speed, i.e. below rated power, wherein a blade pitch set-point is applied which serves to maximize the wind power capture for each incident wind speed. Typically, as incident wind signal an average wind speed is used calculated from measurements taken at the hub height by an anemometer located there. In accordance with the value of said average wind speed, a single pitch angle set-point is calculated and applied to the three blades.
- A control area above the rated wind speed wherein the pitch angle is regulated in order to maintain the power constant (typically at a value equal to the rated power). The blade pitch angle for each incident wind speed is applied jointly to the three blades.

However, in the control area below the rated wind speed, the fact that the blade pitch angle is calculated in accordance with the average wind speed (or a signal indicative thereof such as the power and/or the blade pitch angle) means that it does not consider effects such as windshear, upflow or misalignment of the nacelle with respect to the wind direction; effects which are largely independent of the average wind speed. This causes that the blade pitch angle calculated in accordance with the average wind speed media is not always optimum from the production side.

With the aim of increasing production in wind regimes below rated wind speed, document EP2556249 discloses a control method consisting of controlling the actuation of the blades (blade pitch angle or alternative control elements) to independently maximize the driving moment of each blade below the rated wind speed. The controller independently calculates the blade pitch set-points for each one of the blades so that it maximizes the driving moment of each one of them when it determines that the wind speed or the force that acts on the blades is below the rated wind speed with the aim of increasing production in said wind regime. To implement said control method it is necessary to know the driving moment of each blade, for which individual load sensors per blade are necessary, the reliability and precision of which is critical in order to maximize said production, and the blades may even be damaged if they give an incorrect measurement. Furthermore, if the sensors are damaged, it will be needed to await until repair of the same before continuing to perform the control method described.

DESCRIPTION OF THE INVENTION

The object of the invention is a control method and system for a wind turbine which enables maximizing the production and reducing the loads in a robust and simple way with respect to the proposals of the abovementioned state of the art. To do this, the wind turbine control system and method here described make it possible to modify the blade pitch angle of each blade according to a set-point calculated exclusively taking into account for this purpose information on the position of each blade and on the wind distribution.

In particular, an object of the invention is a wind turbine control method comprising:
- a rotor with a plurality of blades, in turn comprising respective actuators configured to vary a pitch angle of each blade,
- and a control unit,
  the method being characterized in that it comprises:
- obtaining at least one value indicative of wind distribution in an area swept by the rotor and,
- determining an azimuthal position for each blade,
- calculating for each blade a variable blade pitch angle set-point according to a periodical function which establishes a blade pitch angle in accordance with the azimuthal position of the blade, where the periodical function has a period substantially equal to that of rotation of the rotor and a phase dependent on at least one value indicative of wind distribution in the area swept by the rotor, and
- sending to the actuators the blade pitch angle set-point.

In this way, the complexity of the required system to optimize the operation of the wind turbine is reduced, as it avoids the use of blade load sensors measurements to carry out the blade pitch control.

The effect on each blade of phenomena which affect wind distribution in the area swept by the rotor (such as windshear, upflow or misalignment) largely depends on its azimuthal position (rotation angle with respect to the rotor axis), i.e. the blades do not experience the same wind conditions in all of them. Using the described control method, the pitch angle of each blade is calculated taking into account the azimuthal position of each blade so that it makes it possible to maximize production and reduce loads without using blade load sensors, once the wind distribution has been characterized in the area swept by the rotor.

To determine the azimuthal position of each blade a sensor of the rotor azimuthal position is used, consisting of a detector of the rotor crossing a zero-reference, i.e. the origin of the reference and related to the position of one of the blades and a crossing counter through intermediate positions which give an incremental angle with respect to said origin. Each blade in a 3 blade rotor is 120° out of phase, so that with the determination of the azimuthal position of the rotor, it determines the azimuthal position of one of the blades and in relationship with the latter the azimuthal position of the two other blades.

The method of the invention comprises obtaining at least one value indicative of wind distribution in an area swept by the rotor (this value indicative of wind distribution in an area swept by the rotor comprises at least one value related to at least one variable selected from among the group consisting of: windshear, wind direction, upflow and wind speed) and determining for each blade a value of azimuthal angle referring to the corresponding azimuthal position of the rotor, to later calculate for each blade a variable blade pitch angle set-point according to a periodical function which establishes a blade pitch angle in accordance with the azimuthal position of the blade, where the periodical function has a period substantially equal to the rotation of the rotor and a phase dependent on at least one value indicative of wind distribution in the area swept by the rotor, and with this being able to send the suitable blade pitch set-point to the actuators.

It should be highlighted that the object of the invention contemplates different possibilities related to the value indicative of wind distribution in the area swept by the rotor; this may be a value dependent on the wind direction and characterized in accordance with wind direction sectors, so that their values are implemented in the controller in the form of a table in accordance with the wind direction or it may be a characteristic value of the site or a value estimated from historical values and in accordance with at least one of the following: direction, wind speed and turbulence intensity, temperature, time of the year and time of the day.

In one aspect of the invention, the method comprises calculating a blade pitch angle which provides the maximum energy capture below a certain production threshold value in accordance with the value of, among others, windshear, upflow or misalignment of the nacelle and of the position of each blade. In this way the method contemplates that, when the wind turbine has to operate below said production threshold value, i.e. the signal indicative of the production level is less than said threshold, an azimuthal blade position is determined, from the value indicative of wind distribution in the area swept by the rotor, wherein a wind speed value is maximum; with the periodical function having a minimum value when the blade is in said azimuthal position.

Furthermore, when the wind turbine has to operate above or at a production value equal to or greater than said production threshold value, i.e. the signal indicative of the production level is greater than or the same, the periodical function has a maximum value when the blade is in the azimuthal position wherein the wind speed value is maximum.

This increases the energy produced without penalizing the machine life with fatigue, as in a partial load production area it incorporates a cyclical pitch movement in one direction to increase the production whilst in the rated power area, the cyclical pitch movement has an opposite direction and the loads are reduced.

Said production threshold value delimits the transition between a partial production area and a rated production area, and can be defined by a production threshold value ($P_{NOM}$) or a wind speed threshold value (Urated).

However, it is advantageous to include a second threshold below the rated production area which marks the area under which the blade pitch angle is controlled to provide the greatest energy capture, whilst the blade pitch angle is controlled from rated power to reduce loads.

The phase of said periodical function is determined to locate the suitable value of the periodical function (maximum or minimum depending on the production area where the wind turbine is operating) in the azimuthal position wherein the wind is maximum. The phase is therefore dependent on the production area where the wind turbine is operating and it may adopt one among the following:

- a predetermined value, being such that the periodical function reaches its minimum value when the blade is in a substantially vertical position with its tip upwards if the wind turbine is operating in a partial production area and such that the periodical function reaches its maximum value when the blade is in a substantially vertical position with its tip upwards;
- a value dependent on the value indicative of the distribution of the wind speed in the area swept by the rotor (windshear),
- a value dependent on the value indicative of the misalignment of the nacelle with respect to the wind direction, and
- a value dependent on the value indicative of the upflow.

The magnitude of the phenomenon that define wind distribution in the area swept by the rotor can be measured, calculated or estimated based on site calibration measurements. Even in one aspect of the invention, it is contemplated that the magnitude of said phenomenon is characterized and predetermined as a function of the wind direction sector.

The value indicative of wind distribution in the area swept by the rotor can be obtained in different ways. Thus, the method described here includes obtaining it from the measurement of at least one sensor, preferably anemometers disposed at different heights either in the wind turbine or in a meteorological mast in a location close to the wind turbine, said value indicative of wind distribution in the area swept by the rotor may comprise a value related to the windshear or the upflow.

Thus, for example, the windshear or windshear profile can be measured using two or more anemometers disposed at different heights in the tower, in addition to the anemometer of the nacelle which is usually mounted in wind turbines, at a height wherein its measurements are not affected by the rotor. Likewise, the value of the upflow can be measured using wind vanes which also measure the vertical component of the wind speed or by several anemometers mounted in the hub of the rotor.

Another alternative to assess the magnitude of effects such as windshear, upflow or misalignment is using sensors placed in the blade root, which provide signals indicative of the loads induced by the wind in the blades. Based on the analysis of these signals throughout the various azimuthal positions of the blades, it is possible to obtain an estimate of the magnitude of the effects to analyse.

Alternatively, and to avoid mounting more sensors in the wind turbine, it is possible to measure the magnitude of these phenomena in one point of the wind farm (meteorological mast) and extrapolate these values to the position of each wind turbine of the farm by means of a function which relates the values of the mast measurements to the values in each machine.

Another possibility is using estimated values of said phenomenon, obtained, for example, in the stage before the wind farm construction, in which the site is characterized determining the characteristic values of wind distribution in the area swept by the rotor. Among others, the parameters considered are: wind speed and wind direction, turbulence intensity, temperature and density, windshear, upflow, etc. Based on these measurements it is possible to estimate the mean values of windshear and upflow before installation of the wind turbine, incorporating said characteristic values in the controller. The estimate can be tuned considering the dependence of these effects on other parameters such as wind direction, wind speed, turbulence intensity, temperature, time of the year and time of the day, etc.

If there are no mean values representative of the wind distribution during the machine operation, the estimates thus calculated can be used to calculate, based on them, the phase and the amplitude of the periodical function which allow the calculation of the blade pitch angle set-points which maximize energy production and/or minimize loads, depending on the production level of the wind turbine.

The misalignment of the nacelle with respect to the wind direction can be measured with the wind vane typically mounted in the nacelle.

The pitch angle set-point calculated according to the described method makes it possible to increase production in the partial production area (i.e. below the Urated speed) even without using a blade load sensor, as it is dependent on a periodical function of frequency 1P (i.e. period equal to the rotor rotation), an amplitude calculated in accordance with the distribution of wind speed in the area swept by the rotor, and a phase dependent on the distribution of wind speed in the area swept by the rotor and such that the minimum of the periodical function is in the azimuthal position wherein the blade experiences more wind or the azimuthal position wherein the wind speed value is maximum. The calculation of the blade pitch set-point does not need to be independent, since although the set-point is different in each instant for each blade, it is calculated with a periodical function dependent on the azimuthal position but which is common for all blades (the characteristic parameters of the function, i.e. amplitude and phase are the same for all of them). This simplifies the calculation and application of the blade pitch set-points.

Although the present invention in its preferred embodiment is aimed at optimizing the blade pitch angles of the blades of a wind turbine to maximize the electrical energy produced in different conditions of wind speed, windshear, upflow, etc., the same strategy can be used to reduce the loads above rated power, in this way compensating for the increase in loads produced below rated power.

Hence, the present invention also proposes a system for a wind turbine to execute the method of the invention; i.e.:

Determining the values of windshear, upflow and/or misalignment. Either based on instantaneous measurements or based on estimates.

Measuring the generated electric power and/or the wind speed to determine if the power generated is either less than a lower production threshold value (approximately 80%) or greater than or equal to the rated power $P_{Nom}$ or the wind speed greater or less/equal to a threshold of lower or lower/equal value than Urated.

Based on the above and on the values of parameters that define the wind field in the rotor (speed, windshear, upflow and misalignment) and the configuration of the machine (rotation speed,) calculate an optimum blade pitch angle which maximizes energy capture.

Said optimum blade pitch angle comprises a collective blade pitch term (common to all the blades throughout their azimuthal run) in accordance with the parameters that define the rotor wind field, so that they define the wind field in the rotor, such that energy capture is maximized and an individual blade pitch term which maximizes the energy capture in each azimuthal position.

Sending to the blade pitch actuators the pitch angle set-point corresponding to each azimuthal position.

BRIEF DESCRIPTION OF THE FIGURES

FIG. 3.—Shows a table giving the relationship between the wind direction with the specific windshear value and the corresponding parameters of the periodical function, phase and amplitude.

FIGS. 7a and 7b.—FIG. 7a shows a periodical function which follows the blade pitch angle in accordance with the azimuthal position whilst FIG. 7b shows the relationship of each blade marking a reference.

FIG. 8a shows a situation where in the power is less than the rated power whilst FIG. 8b shows a situation wherein the power is greater than or equal to the rated power.

PREFERRED EMBODIMENT OF THE INVENTION

Below, a preferred embodiment is described of the wind turbine control method comprising several blades equipped in turn with respective actuators configured to vary a pitch angle of each blade and a control unit, configured to calculate for each blade a blade pitch set-point. The proposed method comprises the following steps:

obtaining at least one value indicative of wind distribution in an area swept by the rotor, determining an azimuthal position for each blade, calculating for each blade a pitch angle set-point ($\beta_1$, $\beta_2$, $\beta_3$) variable according to a periodical function which establishes a blade pitch angle in accordance with the azimuthal position of the blade ($\theta_1$, $\theta_2$, $\theta_3$) where the periodical function has a period substantially equal to that of rotation of the rotor and a phase $\phi$ dependent on at least one value indicative of wind distribution in the area swept by the rotor, and sending the the actuators the blade pitch set-point.

Figure 1:
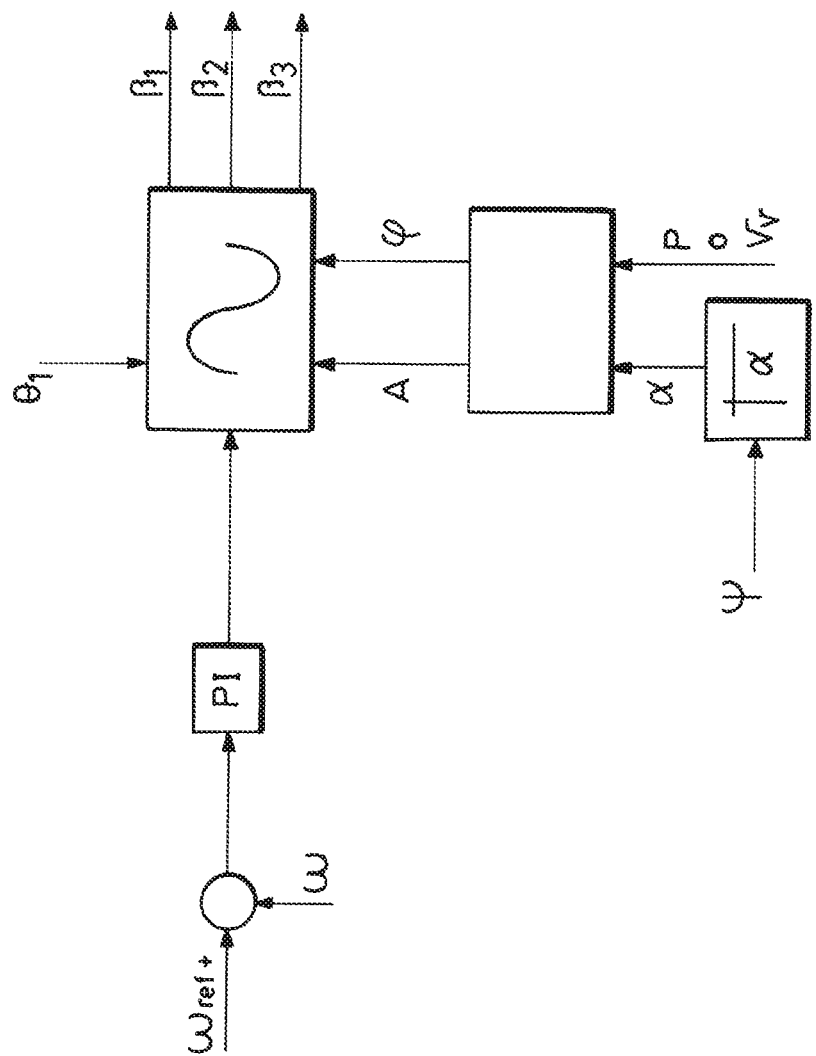
FIG. 1.—Shows a block diagram representative of the method implementation in the wind turbine control unit.

FIG. 1 shows the block diagram corresponding to the implementation of the method in the control unit of the wind turbine. The blade pitch angle set-points sent to each blade ($\beta_1$, $\beta_2$, $\beta_3$) are obtained from a periodical function dependent on the azimuthal position of the blade ($\theta_1$, $\theta_2$, $\theta_3$), where the periodical function calculated in the calculation block of individual blade set-points and has a period substantially equal to that of rotation of the rotor and a phase $\phi$ dependent on at least one value indicative of wind distribution in the area swept by the rotor.

In a possible preferred embodiment of the invention, before the installation of the wind turbine the site is characterized by taking various measurements representative of the wind characteristics in that position to obtain a precise characterization of the wind speed distribution in the area swept by the rotor. Among these characteristics, indicative values are taken of windshear profile (hereinafter windshear) and/or upflow. In a preferred embodiment the windshear $\alpha$ is taken as sole indicative value of wind speed distribution.

Figure 2:
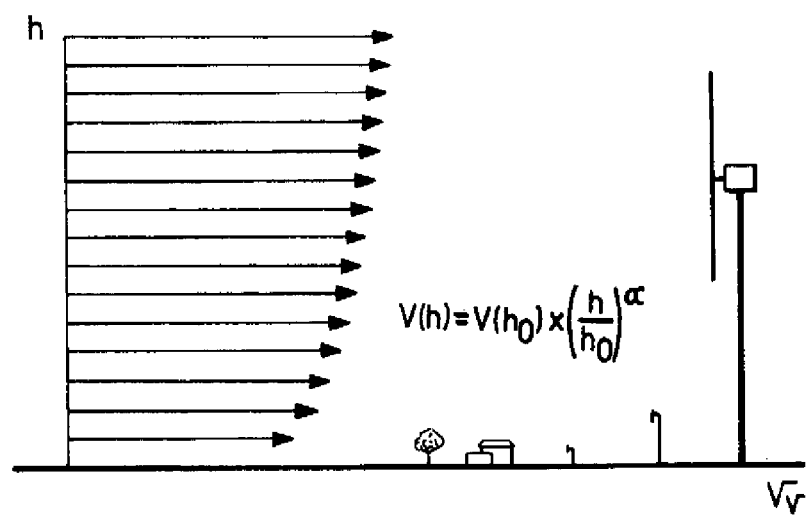
FIG. 2.—Shows a graphic representation of the windshear effect

The windshear value $\alpha$ is the variation in stationary state of the average wind speed with height and depends, among other factors, on the roughness of the land as represented schematically in FIG. 2. There are various models that relate the wind speed to a certain height V(h), with the wind speed at a reference height (normally the axle casing height) V(h0). The exponential model graphically represented in FIG. 2 characterizes the windshear profile in accordance with the windshear exponent $\alpha$.

$$V(h) = V(h_0) \times \left(\frac{h}{h_0}\right)^\alpha$$

Thus, in a preferred embodiment, as value indicative of wind distribution in the area swept by the rotor, it takes the exponent of the windshear function a. As this value may depend on the direction and/or on the wind speed (as the roughness of the terrain may vary depending on the wind direction as it is dependent on geographical aspects), in one embodiment different values of a are obtained associated to the different angular wind sectors direction and/or wind speeds to characterize the windshear in accordance with the direction. In this way, the step of obtaining at least one value indicative of wind distribution in an area swept by the rotor comprises measuring the wind direction and/or wind speed and finding for said values the corresponding value of the exponent of the windshear function. The relationship between the values of wind direction and/or wind speed and the windshear function is implemented in a wind turbine controller in the form of table in a preferred embodiment (as observed in FIGS. 3 and 4).

In a possible simpler preferred embodiment, a value is assumed of the exponent $\alpha$ as a constant independent of the wind direction. Said value oscillates within the range of typical values which is between 0.1 for not very rough sites and 0.5 for sites with more roughness.

Alternatively, sensors are disposed which make it possible to obtain the wind speed distribution from wind speed measurements at different heights. For example, anemometers can be disposed at different heights which make it possible to obtain a real time estimate of the value of $\alpha$.

From that windshear value $\alpha$, a control system of the wind turbine calculates a variable blade pitch angle set-point according to a periodical function which establishes the blade pitch angle in accordance with its azimuthal position $\theta$ where a period of the function is calculated from the rotation speed of the rotor and a phase $\phi$ of the function is calculated from the windshear $\alpha$; the system then sends the actuators the pitch set-point.

The function which establishes the pitch angle set-point of each blade will be as follows, having a common component for all blade set-points ($\beta_{med}$) and a component defined by the periodical function:

$$\beta_1 = \beta_{med} + A \times \text{seno}(\theta_1 + \phi)$$

$$\beta_2 = \beta_{med} + A \times \text{seno}(\theta_2 + \phi) = \beta_{med} + A \times \text{seno}(\theta_1 + 120 + \phi)$$

$$\beta_3 = \beta_{med} + A \times \text{seno}(\theta_3 + \phi) = \beta_{med} + A \times \text{seno}(\theta_2 + 240 + \phi)$$

Where:

$\beta_1$ is the pitch angle set-point for the blade 1

$\beta_{med}$ is the component of the blade pitch angle common to all blades and independent of the azimuthal position of each blade.

A is the amplitude of the periodical function $\theta$ is the azimuth angle of the blade 1

$\phi$ is the phase of the periodical function

So that the periodical function is unique for all the blades (in the sense that the values that characterize it: amplitude and phase are the same) and it differs in each instant for each blade since the position of each one of them is out of phase 120°.

The component of the blade pitch angle which is common to all of them and independent of the azimuthal position $\beta_{med}$ is calculated by a rotation speed regulator of the wind turbine, as indicated in FIG. 1 and corresponds to the blade angle required to maintain the rotation speed $\omega$ equal to the rotation speed of reference $\omega_{ref}$ in stationary state.

Figure 4:
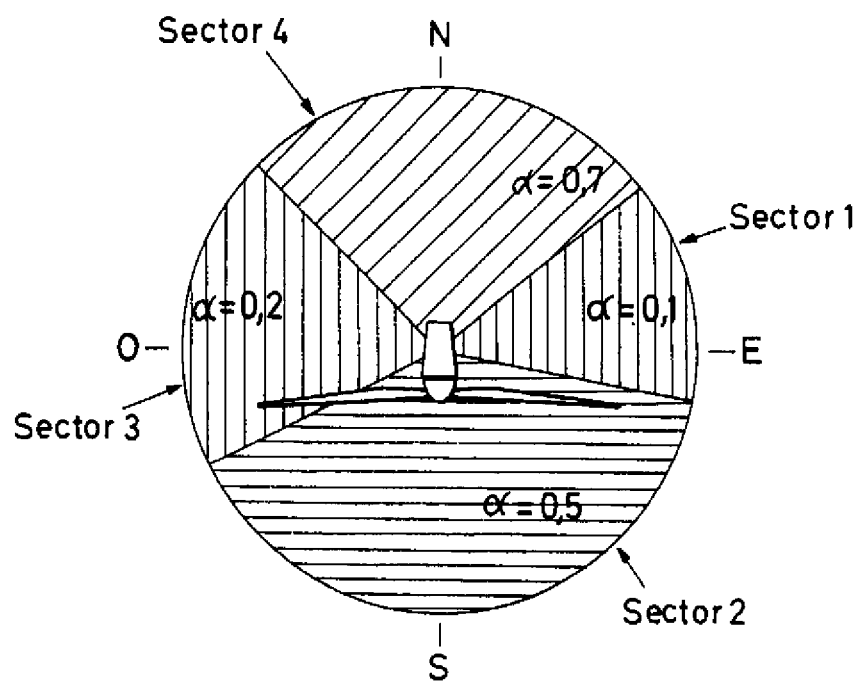
FIG. 4—Shows a representation of a wind turbine in plan view, where different wind direction sectors are observed for which the characteristic windshear value has been characterized.

In one embodiment, the at least one predetermined value of wind distribution (i.e. windshear value $\alpha$ in the area swept by the rotor is different for different wind direction sectors. In this case, in the site calibration stage it characterizes windshear value so that the control unit of the wind turbine a table is incorporated which relates the windshear value exponent $\alpha$ in accordance with the direction, it calculates the wind direction from the orientation of the machine and from the weather vane signal and the value characteristic of $\alpha$ is obtained for the direction measured from the site calibration data. In FIG. 4, a figure can be observed with different wind sectors wherein the windshear value has been characterized. Furthermore, FIG. 3 shows a table indicating windshear value $\alpha$ for different wind sectors, in addition to the amplitude of the function of said windshear value.

In said FIG. 4 orientation sectors of the machine are seen for which the windshear is characterized and varies. According to said embodiment, the wind direction is obtained from the measurements of the corresponding sensors, the wind direction is compared with the orientation sectors, and the windshear value is taken from the orientation sector within which the wind direction is included. In intermediate areas between said sectors, values are used interpolated between the corresponding windshear values. The phase φ and the amplitude of function A of the periodical function is obtained from said windshear α.

Figure 5:
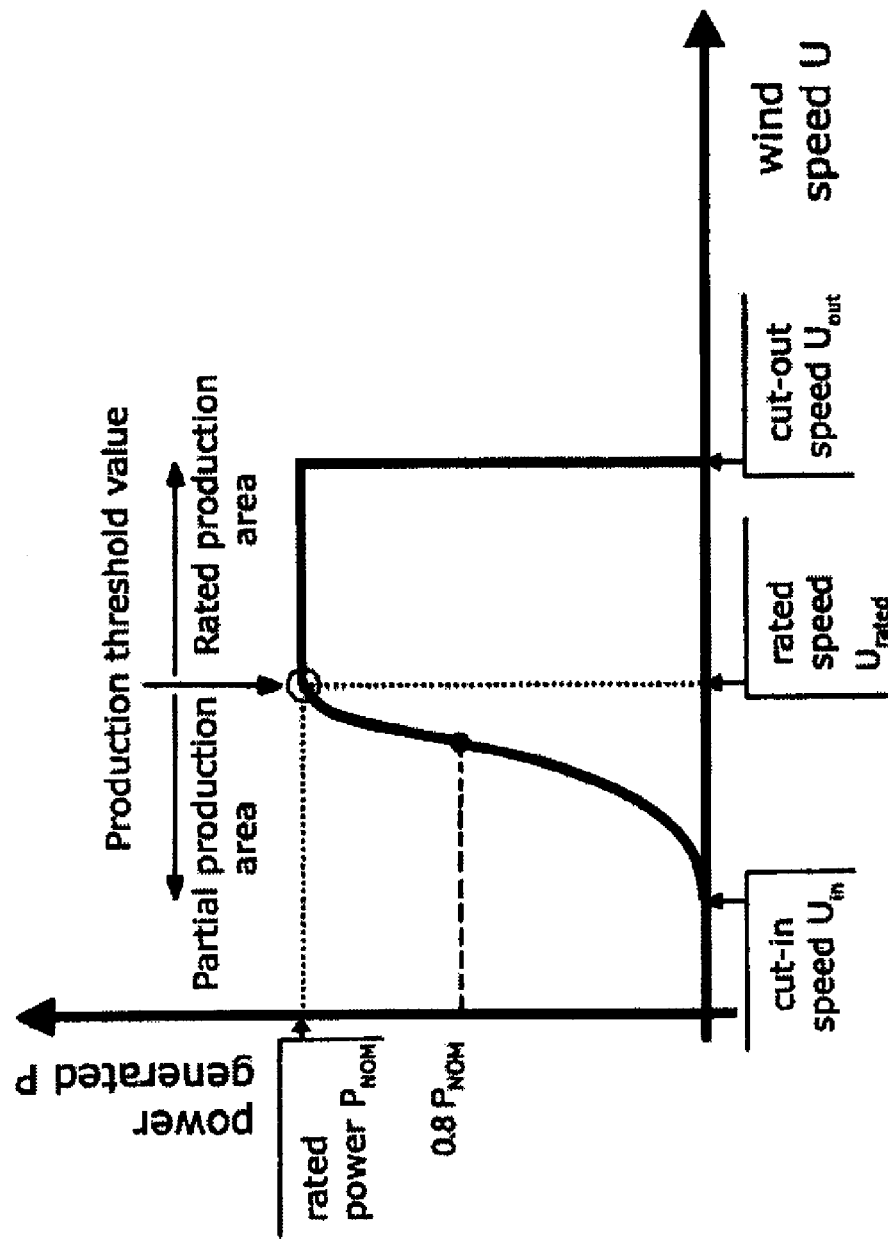
FIG. 5.—Shows a graphic representing a power curve showing two area of action of the method in accordance with the thresholds.

Thus, the control method of the wind turbine comprises performing the following tasks:

Obtaining a value characteristic of α as indicated above;

Comparing the value of a signal indicative of the production level with a production threshold value. The wind speed Vv or the power generated P can be used as signals indicative of the production level, so that the respective threshold production values are a wind speed threshold value Urated and a production threshold value equal to the rated power value $P_{NOM}$. The production threshold values can be seen in FIG. 5.

Establishing a value for the phase of the periodical function in accordance with the result of the comparison between the value of the signal indicative of the production level with the production threshold value.

Establishing a value of the amplitude A dependent on the value characteristic of α.

In the table shown in FIG. 4, it also specifies the corresponding phase φ of the periodical function when the upflow is 0° for a vertical windshear greater than 0, depending on the comparison of the value indicative of the production level (in this case the power generated P) with the production threshold value (in this case the value corresponding to the rated power $P_{NOM}$). It can be seen how said phase φ, when the power is below the rated power (i.e. areas of partial production, the phase φ is 270° which is equivalent to saying that the minimum angle of the blade pitch angle in a turn (with the constant mean angle in said turn) occurs when the blade is in vertical and upwards. This makes it possible to achieve a greater production at partial loads without the need for other sensors than those typically used. However, in rated production levels (i.e. P>=$P_{NOM}$) the phase is 90°, which is equivalent to stating that the maximum value of the pitch angle in one turn (with the constant mean angle in said turn) occurs when the blade is in vertical and upwards.

Figure 6:
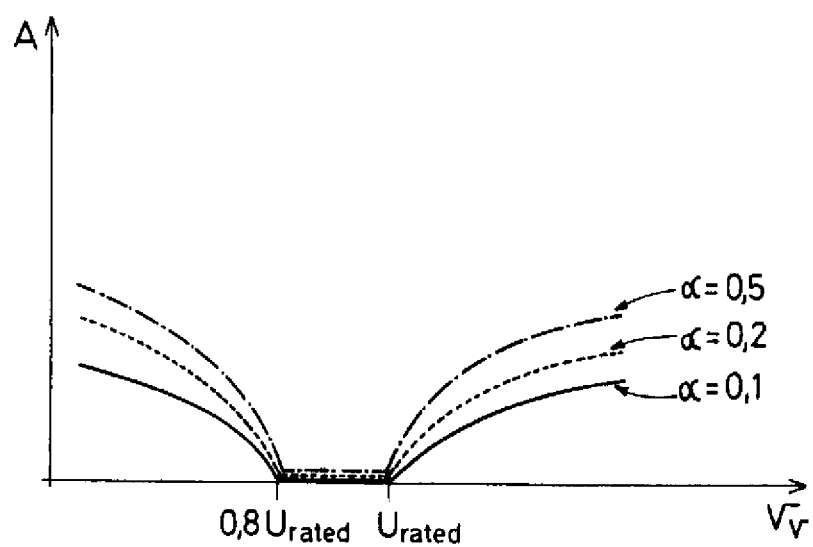
FIG. 6.—Shows a graphic of the relationship between the amplitude of the periodical function with the wind speed for different windshear values.

The amplitude of the periodical function is calculated based on the value of the windshear exponent α. This value may also be dependent on the incident wind speed as can be seen in FIG. 6. In said figure, the amplitude of the periodical function A is represented in accordance with the wind speed for different windshear values. It is also seen how said amplitude follows a decreasing monotonous function in the partial production area (below Urated). Likewise, with a greater windshear value α the value of the amplitude A for the same wind speed value.

In a preferred embodiment, it exclusively takes the windshear value as the value indicative of wind speed distribution, as it is a parameter that can be easily characterized in the site study and with slow temporal evolution.

Figure 8B:
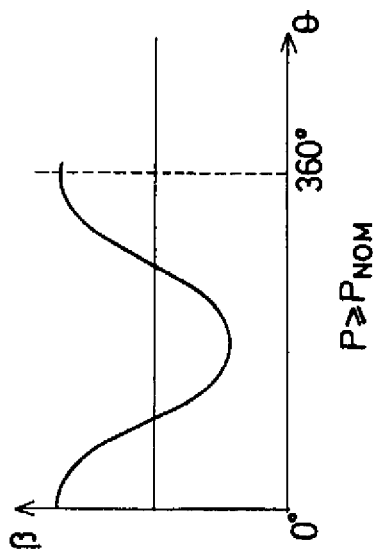
FIGS. 8a and 8b.—Show graphics of specific cases of the blade pitch angle where
Figure 8A:
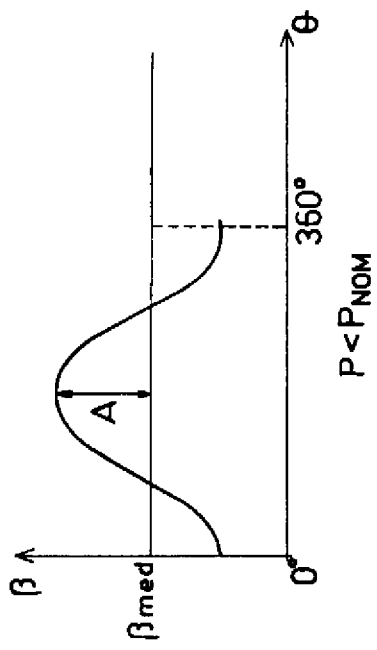

This being the case, the maximum incident wind speed on a blade occurs when it is vertical and upwards (FIG. 8). In this case, the phase of the periodical function when the power is below the rated power is such that the periodical function reaches its minimum value when the blade is in a substantially vertical position with its tip upwards as shown in FIG. 8a. However, when the power is above the rated power, the periodical function reaches its maximum value when the blade is in a substantially vertical position with its tip upwards as shown in the FIG. 8b, equally coinciding with the position wherein the blade is in vertical upwards.

Likewise, the mean value of the function is calculated in accordance with the incident wind speed (or of the power generated). This value may also be dependent on the windshear α.

The control system proposed here makes it possible to increase the energy captured below rated wind speed with respect to the control systems of the state of the art based on collective pitch.

This control strategy also has associated an increase in the fatigue loads suffered by the wind turbine.

To compensate this load increase below rated wind speed, when the wind speed is above the rated and there is more energy available than the machine can generate, the control system will phase shift 180° the periodical function, so that its maximum value coincides with the position in which the blade experiences more wind. In this way, it manages to reduce the fatigue loads above $P_{NOM}$. In this case, the tasks that the control method executes are:

Assessing if the wind speed is greater than a threshold wind speed value Urated, or if the electric power generated P is greater than a rated power value $P_{NOM}$.

Obtaining the value characteristic of α.

From that windshear value α, the control system calculates a variable blade pitch angle set-point according to a periodical function which establishes the blade pitch angle in accordance with its azimuthal position where:

The period is calculated from the rotation speed of the rotor;

The phase φ is calculated from the windshear α, and is such that the function reaches its maximum value in the azimuthal position wherein the blade experiences a greater wind speed, And it sends the actuators the pitch set-point.

Similarly to when it is below $U_{rated}$, in this case (above $U_{rated}$): The amplitude of the periodical function is calculated based on the value of the windshear exponent α.

This value can also be dependent on the incident wind speed.

In the case of vertical windshear, the phase depends on the sign of α which gives the windshear direction. So that, with positive α, the phase of the periodical function is such that it reaches its maximum value when the azimuth angle is θ=0, i.e. when the blade is in vertical position and with its tip upwards as in FIGS. 3a and 3b. In this case the value of the phase is φ=270°.

The mean value of the function is calculated in accordance with the incident wind speed (or the power generated). This value may also be dependent on the windshear value α.

As gathered from observing FIGS. 7a and 7b, in the case wherein it is determined that there is a positive windshear and the power is below the rated power $P_{NOM}$ the phase is 270° so that the minimum of the periodical function is given for θ equal to 0°, i.e. the blade in vertical according to FIG. 6b.

In the case of FIG. 7b, where the blade set-point is observed in a turn for the case wherein the power is greater than the rated power, so that the phase is 90° and, therefore, the maximum blade pitch value is when the blade is in a vertical position with its tip pointing upwards, i.e. in an azimuthal position θ equal to 0°.

The invention claimed is:

1. A wind turbine control method for a wind turbine equipped with:

a rotor with a plurality of blades, in turn comprising respective actuators configured to vary a pitch position of each blade, and a control unit, the wind turbine control method comprising:
  obtaining at least one value indicative of wind distribution in an area swept by the rotor and,
  determining a first azimuthal position for each blade,
  calculating for each blade a variable blade pitch angle set-point according to a periodical function which establishes a blade pitch angle in accordance with the first azimuthal position of each blade, where the periodical function has a period substantially equal to that of rotation of the rotor and a phase dependent on at least one value indicative of wind distribution in the area swept by the rotor,
  making the variable blade pitch angle set-point reach the actuators, wherein the actuators vary the pitch position of each blade according to the variable blade pitch angle set-point calculated; and
  determining, from the at least one value indicative of wind distribution in the area swept by the rotor, a second azimuthal position wherein a wind speed value is maximum, wherein the method further comprises:
  comparing a signal indicative of a production level with a production threshold value and when the signal indicative of the production level is less than the production threshold value the phase of the periodical function is such that the periodical function has a minimum value in the second azimuthal position in which the wind speed value is maximum.

2. The wind turbine control method according to claim 1, wherein the at least one value indicative of wind distribution in the area swept by the rotor comprises at least one value related to at least one variable from among the group consisting of: windshear, wind direction, upflow and wind speed.

3. The wind turbine control method according to claim 1, wherein when the signal indicative of the production level is greater than or equal to the production threshold value the phase of the periodical function is such that the function has a maximum value in the second azimuthal position wherein the wind speed value is maximum.

4. The wind turbine control method according to claim 3, wherein the signal indicative of the production level is an electric power generated (P) and the production threshold value is a production threshold value equal to a rated power ($P_{NOM}$).

5. The wind turbine control method according to claim 4, wherein the production threshold value is less than 80% of the rated power value ($P_{NOM}$).

6. The wind turbine control method according to claim 1, wherein the phase of the periodical function has a predetermined value.

7. The wind turbine control method according to claim 1, wherein the phase of the periodical function is calculated in accordance with the at least one value indicative of wind distribution in the area swept by the rotor.

8. The wind turbine control method according to claim 6, wherein the predetermined value of the phase of the periodical function is such that the periodical function reaches its minimum value when each blade is in a substantially vertical position with its tip upwards.

9. The wind turbine control method according to claim 1, wherein the at least one value indicative of wind distribution in the area swept by the rotor is obtained from a measurement of at least one sensor.

10. The wind turbine control method according to claim 1, wherein the at least one value indicative of wind distribution in the area swept by the rotor is a predetermined value.

11. The wind turbine control method according to claim 10, wherein the at least one value of wind distribution in the area swept by the rotor is different for different wind sectors direction for which a characteristic windshear value has been characterized.

12. The wind turbine control method according to claim 11, wherein at least one wind distribution value in the area swept by the rotor is a value characteristic of a site.

13. The wind turbine control method according to claim 12, wherein the periodical function has an amplitude dependent on the at least one value indicative of wind distribution in the area swept by the rotor.

14. The wind turbine control method according to claim 13, wherein the amplitude of the periodical function is dependent on a wind speed and decreasing monotonic.

15. The wind turbine control method according to claim 1, wherein the at least one value indicative of wind distribution in the area swept by the rotor is a value estimated from historical values and in accordance with at least one of the following: direction, wind speed and turbulence intensity, temperature, time of the year and time of the day.

16. A wind turbine control system comprising:
  a rotor with a plurality of blades, in turn comprising respective actuators adapted to vary a pitch angle of each blade,
  and a control unit,
wherein the control unit is configured to execute the wind turbine control method described in claim 1.

17. The wind turbine control method according to claim 1, wherein the signal indicative of the production level is an electric power generated (P) and the production threshold value is a production threshold value equal to a rated power ($P_{NOM}$).

18. The wind turbine control method according to claim 10, wherein at least one wind distribution value in the area swept by the rotor is a value characteristic of a site.

* * * * *